(12) United States Patent
Stimely

(10) Patent No.: US 7,185,901 B1
(45) Date of Patent: Mar. 6, 2007

(54) GOLF CART SPINDLE

(76) Inventor: Steven J. Stimely, 76 Judge Rd., McVeytown, PA (US) 17044

( * ) Notice: Subject to any disclaimer, the term of this patent is extended or adjusted under 35 U.S.C. 154(b) by 0 days.

(21) Appl. No.: 11/162,097

(22) Filed: Aug. 29, 2005

Related U.S. Application Data

(60) Provisional application No. 60/522,189, filed on Aug. 30, 2004.

(51) Int. Cl.
*B16D 7/18* (2006.01)

(52) U.S. Cl. .......... 280/93.512; 280/103; 280/124.125; 301/126; 301/127; 301/132

(58) Field of Classification Search ........... 280/93.512, 280/103, 124.113, 124.114, 124.125; 301/126, 301/127, 130, 131, 132
See application file for complete search history.

(56) References Cited

U.S. PATENT DOCUMENTS

| | | | | |
|---|---|---|---|---|
| 2,882,063 A | * | 4/1959 | Strasel | 280/43 |
| 3,334,911 A | * | 8/1967 | Enters | 280/43 |
| 3,908,480 A | * | 9/1975 | Afanador et al. | 74/511 R |
| 4,127,306 A | * | 11/1978 | Foster | 301/127 |
| 5,199,730 A | * | 4/1993 | Westfall et al. | 280/93.512 |
| 5,226,691 A | * | 7/1993 | Kane | 301/132 |
| 5,466,051 A | * | 11/1995 | Liao | 301/111.06 |
| 6,299,259 B1 | * | 10/2001 | MacKarvich | 301/127 |

* cited by examiner

*Primary Examiner*—Paul N. Dickson
*Assistant Examiner*—Timothy Wilhelm
(74) *Attorney, Agent, or Firm*—John J. Elnitski, Jr.

(57) ABSTRACT

A golf cart spindle to allow mounting of a larger wheel and tire combination on a golf cart. The spindle having a spindle body which includes a top end and a bottom end, the spindle body including a bolt channel between the top end and bottom end of the spindle body, the spindle body sized to fit existing front spindle supports of the golf cart as a replacement to the production spindle. The spindle having a spindle leg extending from the spindle body, the spindle leg having a spindle end attached to the spindle body; the spindle leg having an axle end. The spindle having an axle extending from the axle end of the spindle leg. Whereby, the spindle leg extends from the spindle body such that the axle end and the axle is positioned forward and lower than the original position of the axle of the production spindle.

15 Claims, 22 Drawing Sheets

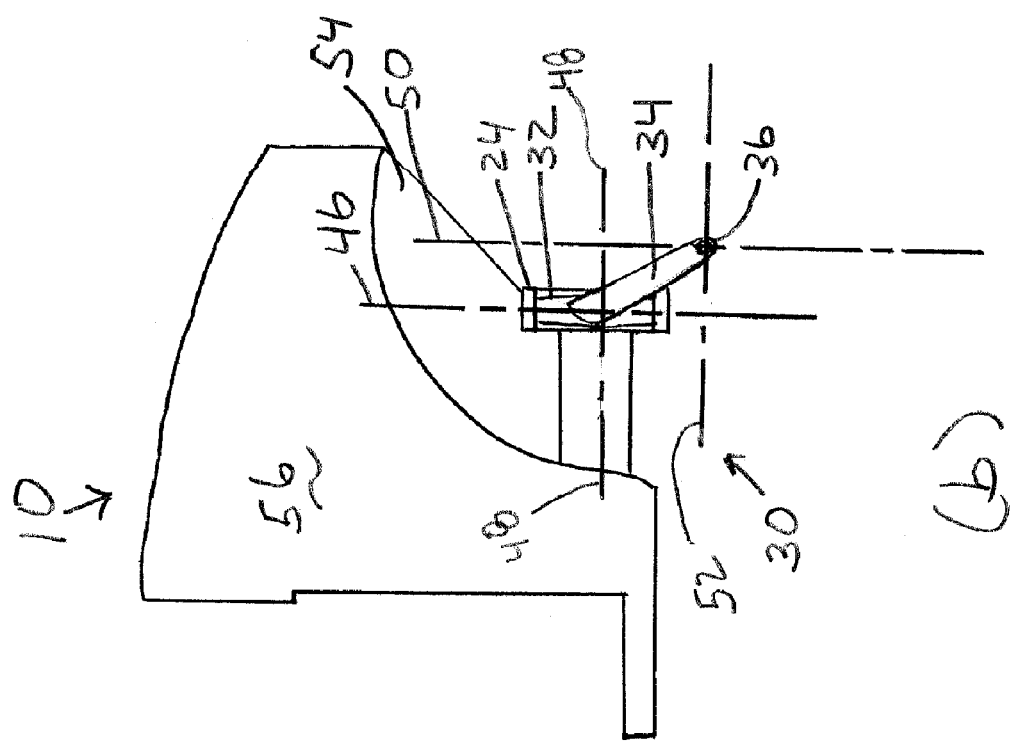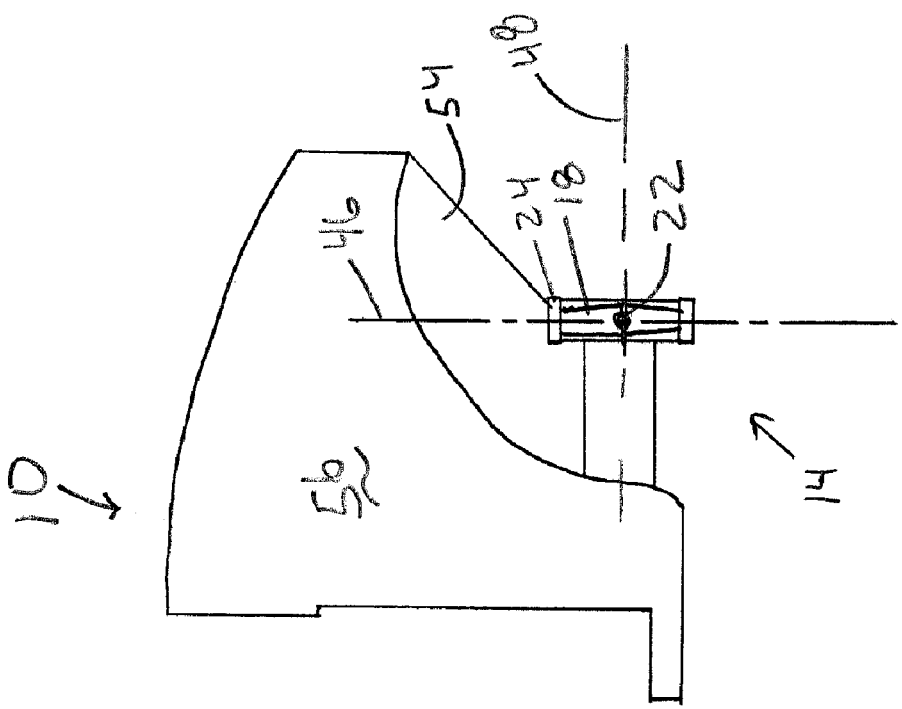
Fig. 5

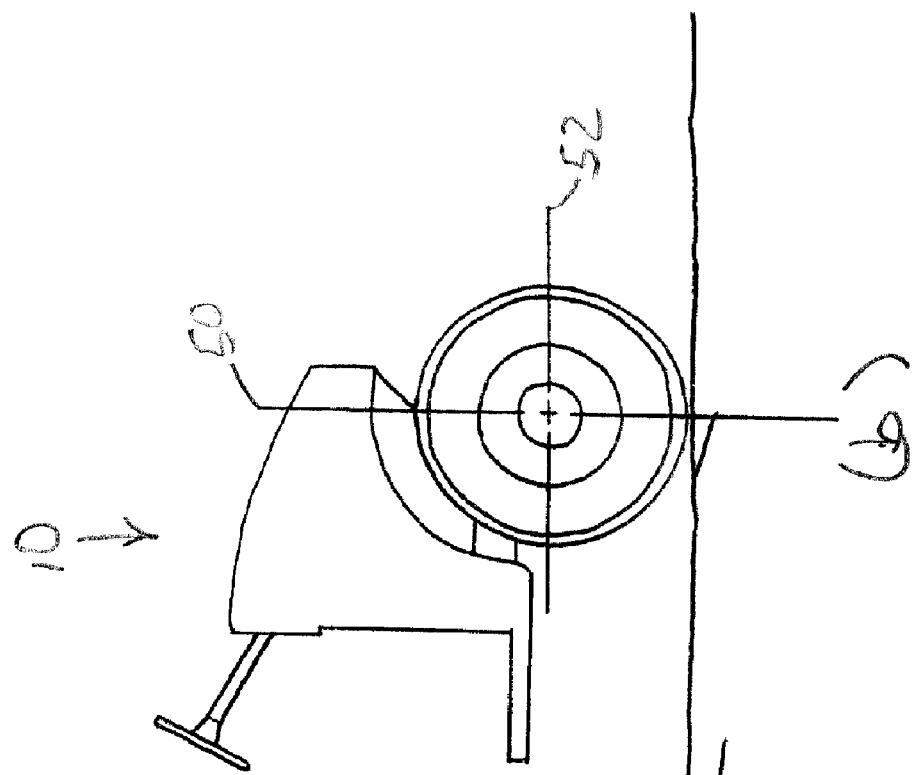
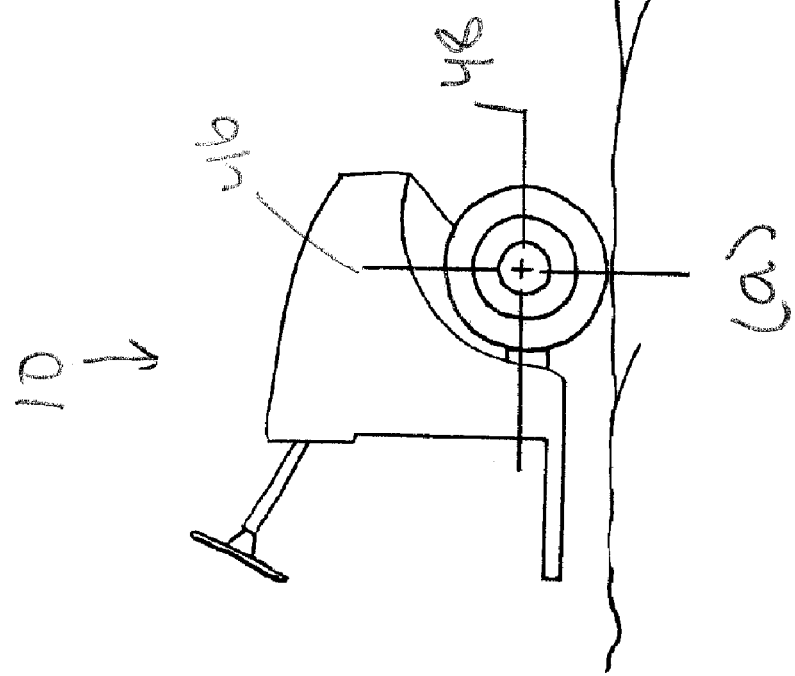
Fig 9

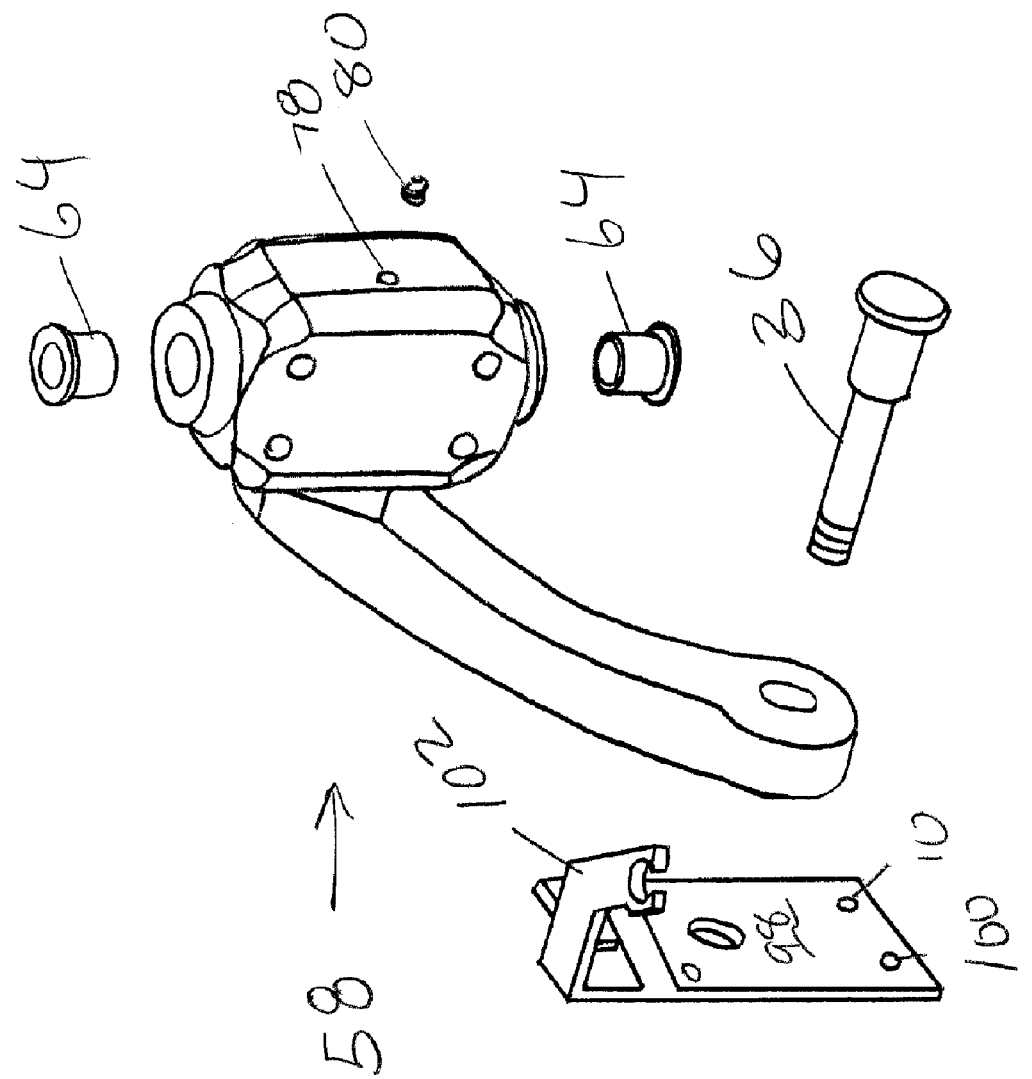

GOLF CART SPINDLE

BACKGROUND

The present invention generally relates to golf carts. More specifically, the present invention relates to wheel spindles used with golf carts.

It has become very popular to install larger wheels and tires on golf carts. The larger wheels and tires are wider and taller than a normal golf cart wheel and tire. The larger wheels and tires provide greater ground clearance and enhance the appearance of the golf cart. FIGS. 1–3 depict a standard golf cart 10 with standard size wheels 12 which normally come installed on new golf carts. FIG. 1 shows the appearance of a standard golf cart 10 with standard size wheels 12. FIGS. 2–3 show a production wheel spindle 14 which is installed on the front of the golf cart 10 of FIG. 1. The production wheel spindle 14 includes a spindle body 18, steering arm 20 and axle 22 extending directly from the spindle body 18. The spindle body 18 is mounted in a U-shaped bracket 24, which a part of the front wheel support of the golf cart 10. The U-shaped bracket 24 is considered as the front spindle support. The spindle body 18 rotates about a bolt 28 installed through the U-shaped bracket 24 and the spindle body 18. Steering linkage attaches to the steering arm 20 to rotate the spindle body 18 to steer the golf cart 10. The axle 22 is for receiving the wheel and tire and extends straight out from the center of the spindle body 18.

The installation of larger wheels and tires on a golf cart is a challenge. Just adding the larger wheels and tires creates a problem of the tire not fitting under the body of the golf cart. There have been different approaches to solve this problem. Most of them involve modifying the frame of the golf cart to lower the U-shaped bracket. One of the problems with this approach is that the frame must be cut and welded, which makes it difficult for the do-it-yourselfer to just add the larger wheels and tires to a golf cart. Another problem is the U-shaped bracket is typically lowered so much so the tire can clear the body of the golf cart, that the stability of golf cart decreases.

It is an object of the present invention to provide replacement spindle to allow mounting of a larger wheel and tire combination on a golf cart.

SUMMARY OF THE INVENTION

A golf cart spindle to allow mounting of a larger wheel and tire combination on a golf cart. The spindle having a spindle body which includes a top end and a bottom end, the spindle body including a bolt channel between the top end and bottom end of the spindle body, the spindle body sized to fit existing front spindle supports of the golf cart as a replacement to the production spindle. The spindle having a spindle leg extending from the spindle body, the spindle leg having a spindle end attached to the spindle body; the spindle leg having an axle end. The spindle having an axle extending from the axle end of the spindle leg. Whereby, the spindle leg extends from the spindle body such that the axle end and the axle is positioned forward and lower than the original position of the axle of the production spindle.

BRIEF DESCRIPTION OF DRAWINGS

FIG. 5 is a side view of a spindle according to the prior art and a spindle according to the present invention.

FIG. 9 is a side view of a golf cart using a spindle according to the prior art and a golf cart using a spindle according to the present invention.

FIG. 22 is a perspective exploded view of a spindle of FIG. 20 according to the present invention.

DETAILED DESCRIPTION

Figure 1:
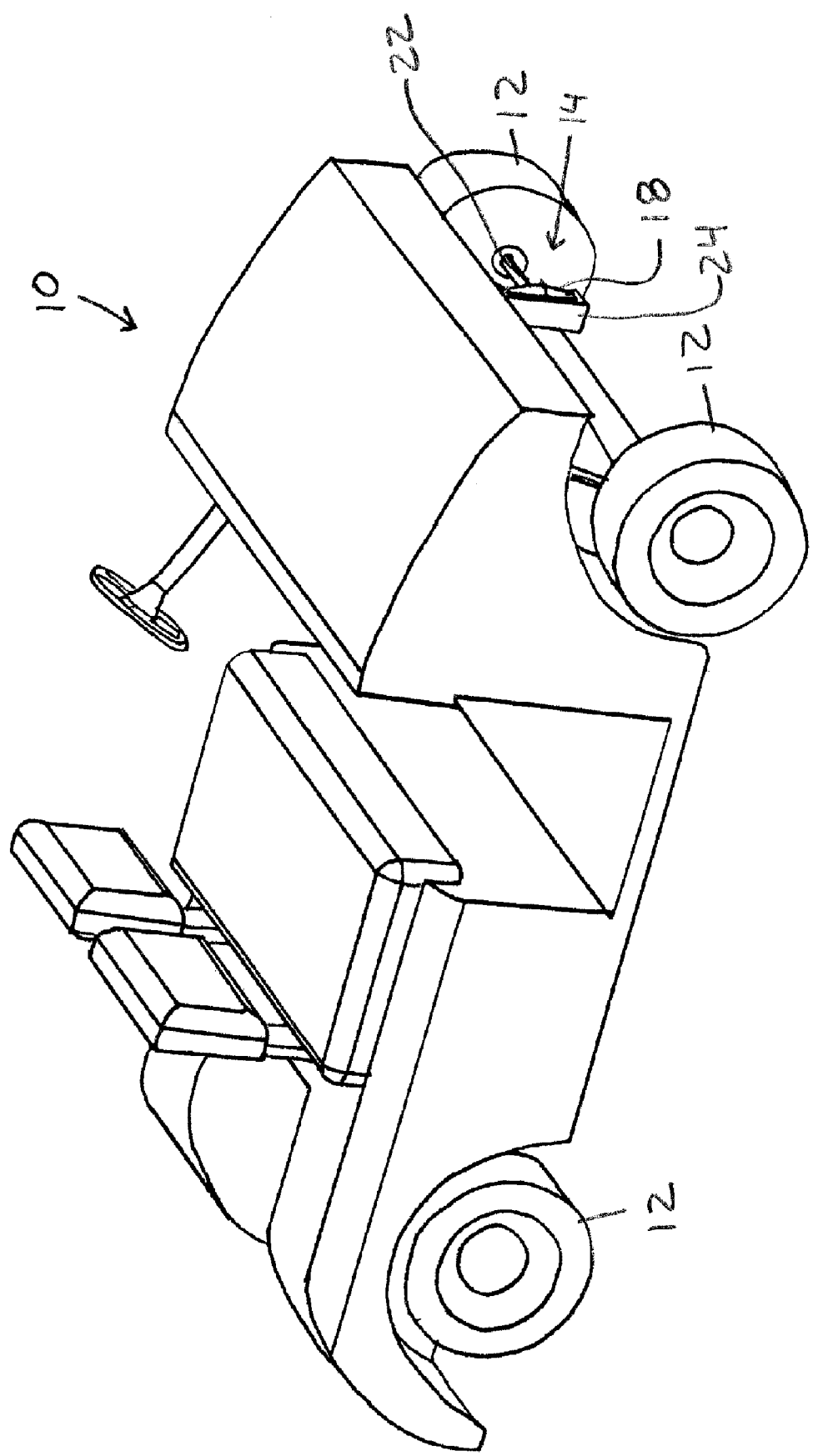
FIG. 1 is a perspective view of a golf cart according to the prior art.
Figure 2:
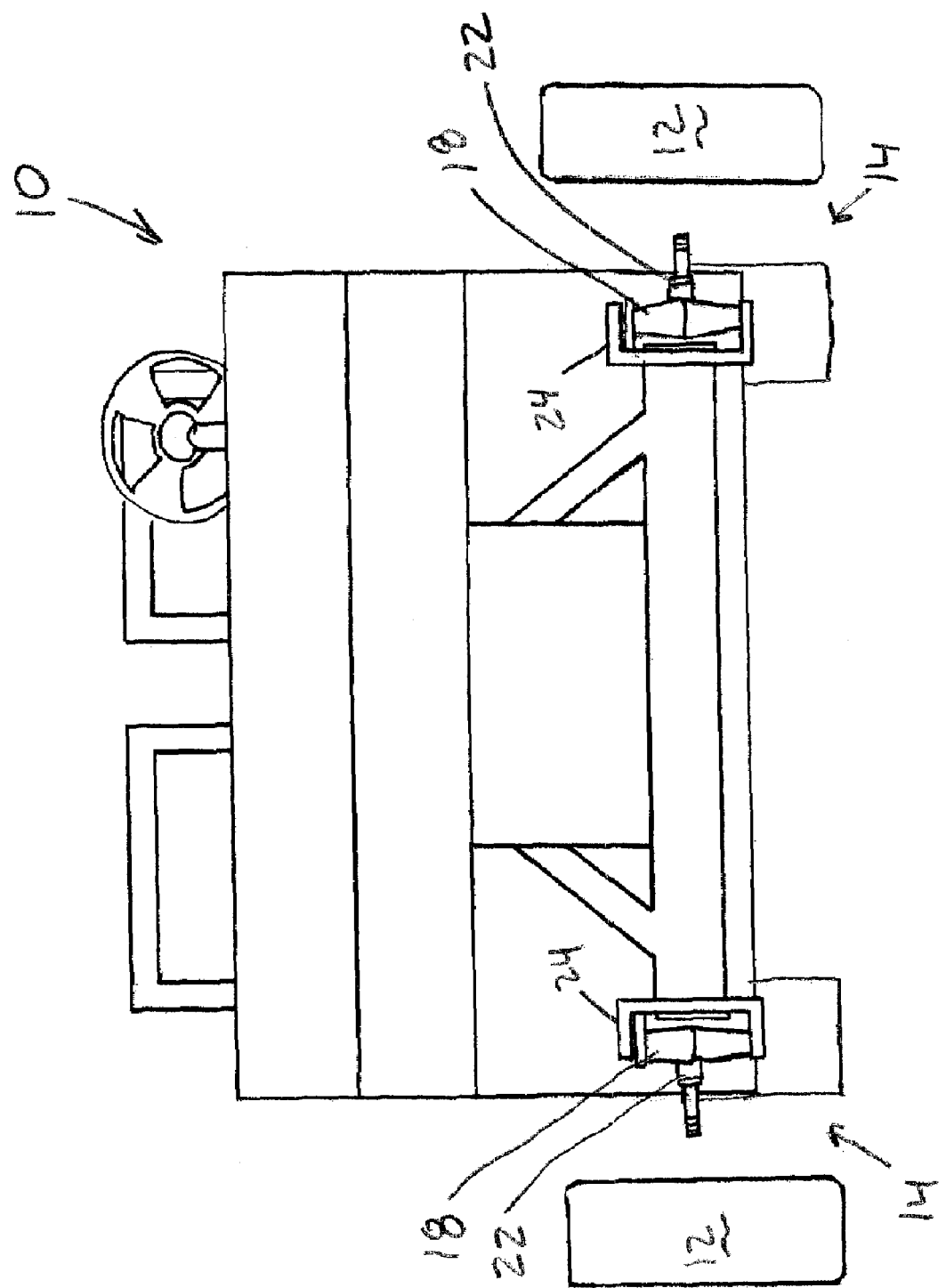
FIG. 2 is a front view of a golf cart according to the prior art.
Figure 3:
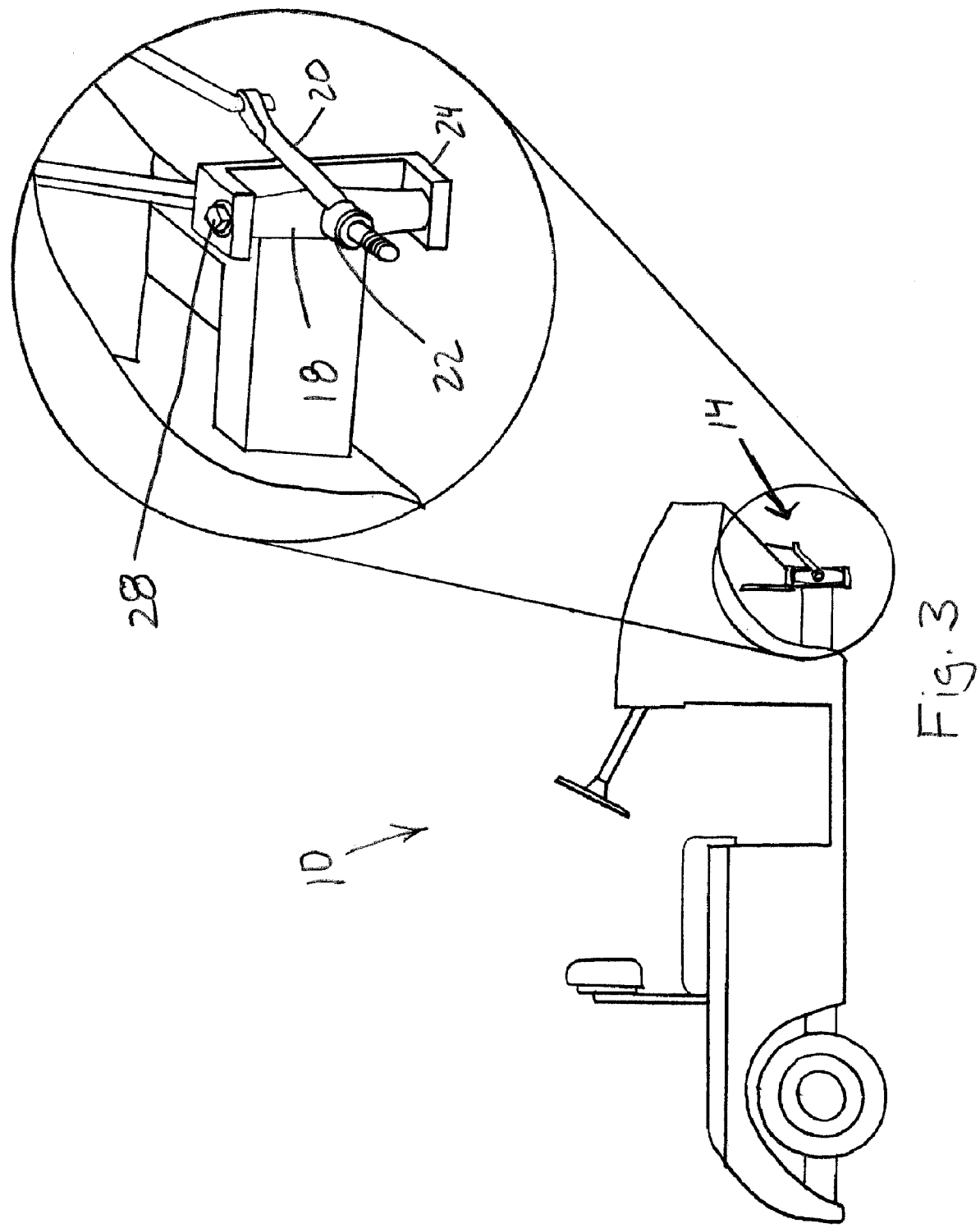
FIG. 3 is a side view of a golf cart according to the prior art.
Figure 4:
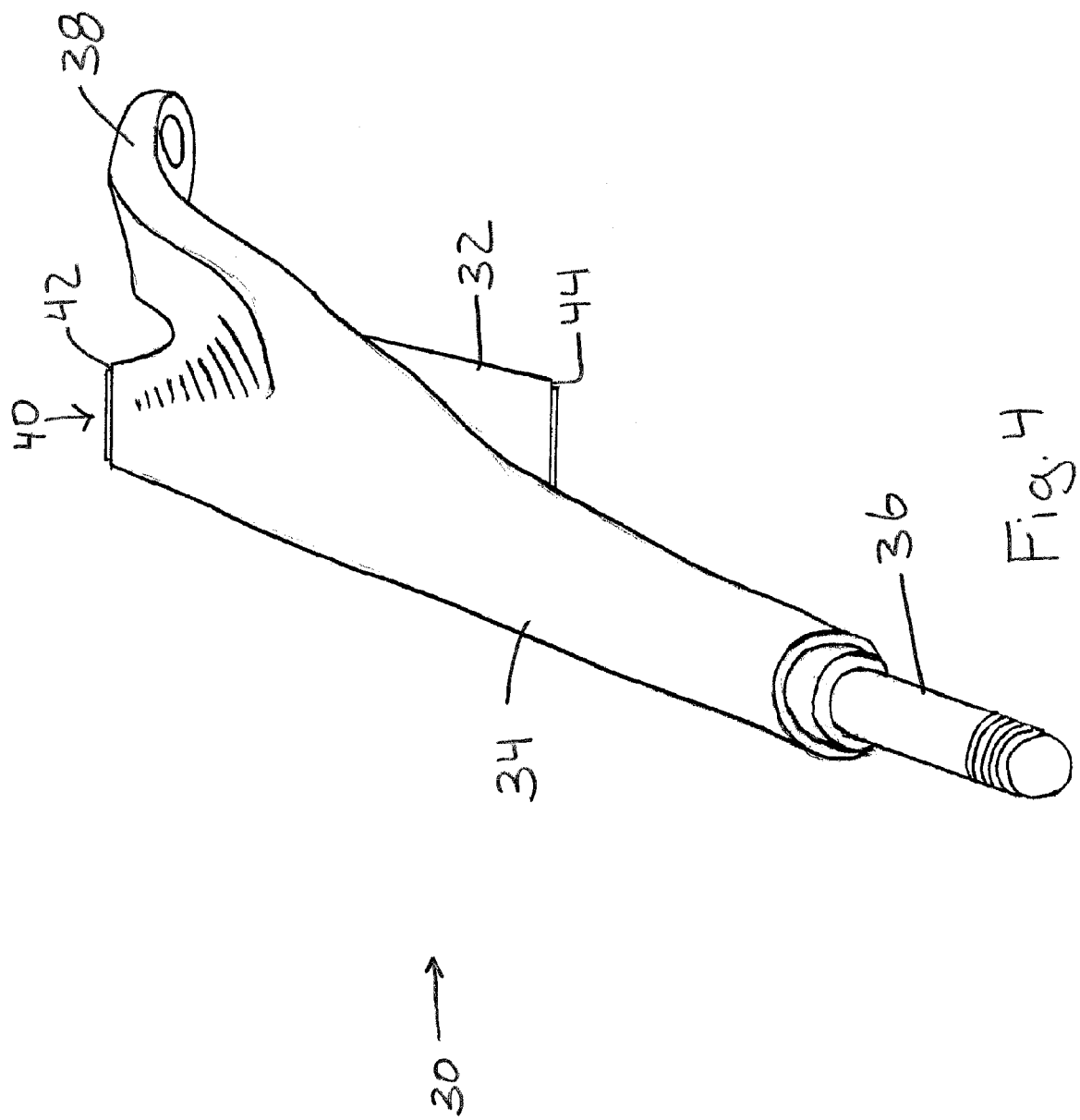
FIG. 4 is a perspective view of a spindle according to the present invention.
Figure 6:
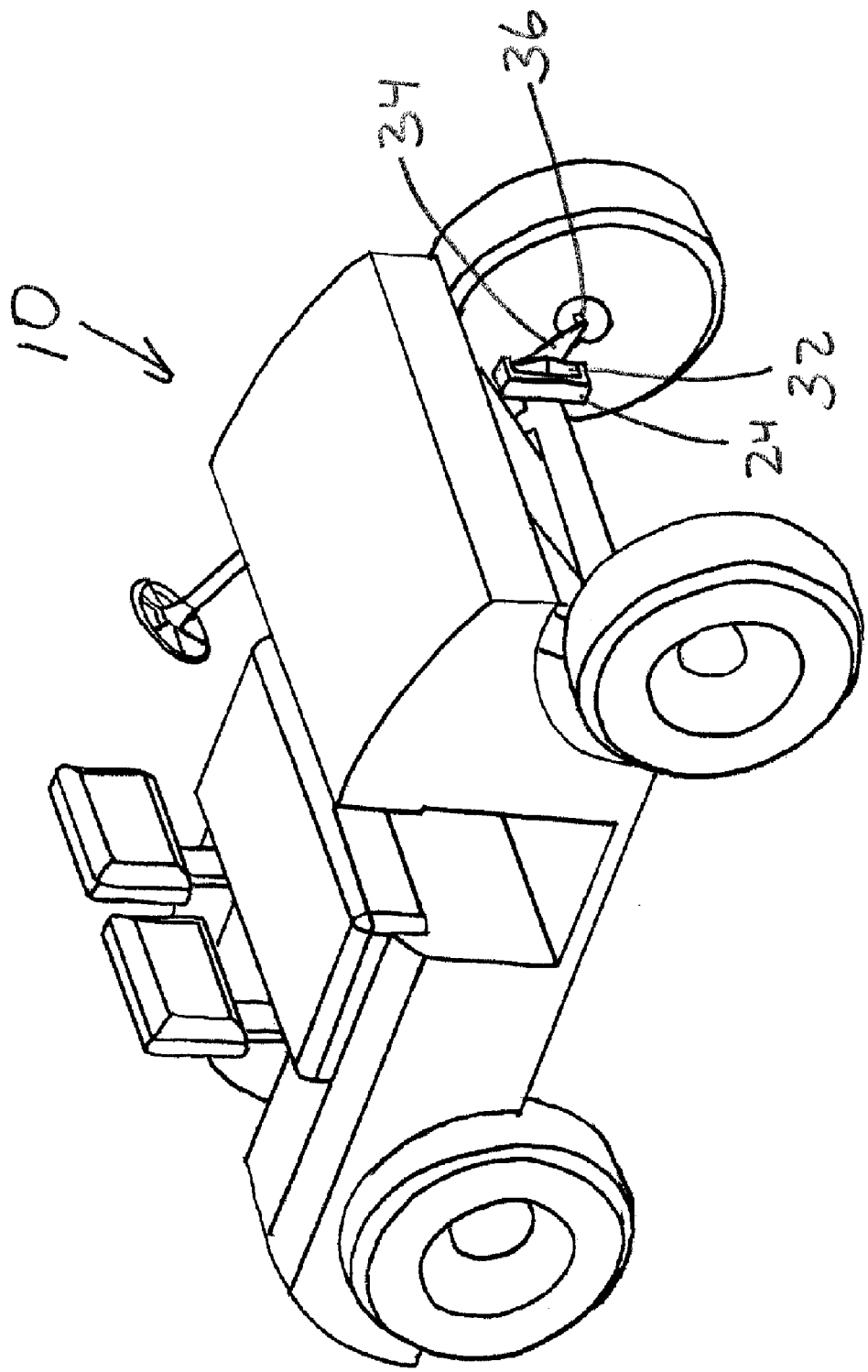
FIG. 6 is a perspective view of a golf cart using a spindle according to the present invention.
Figure 7:
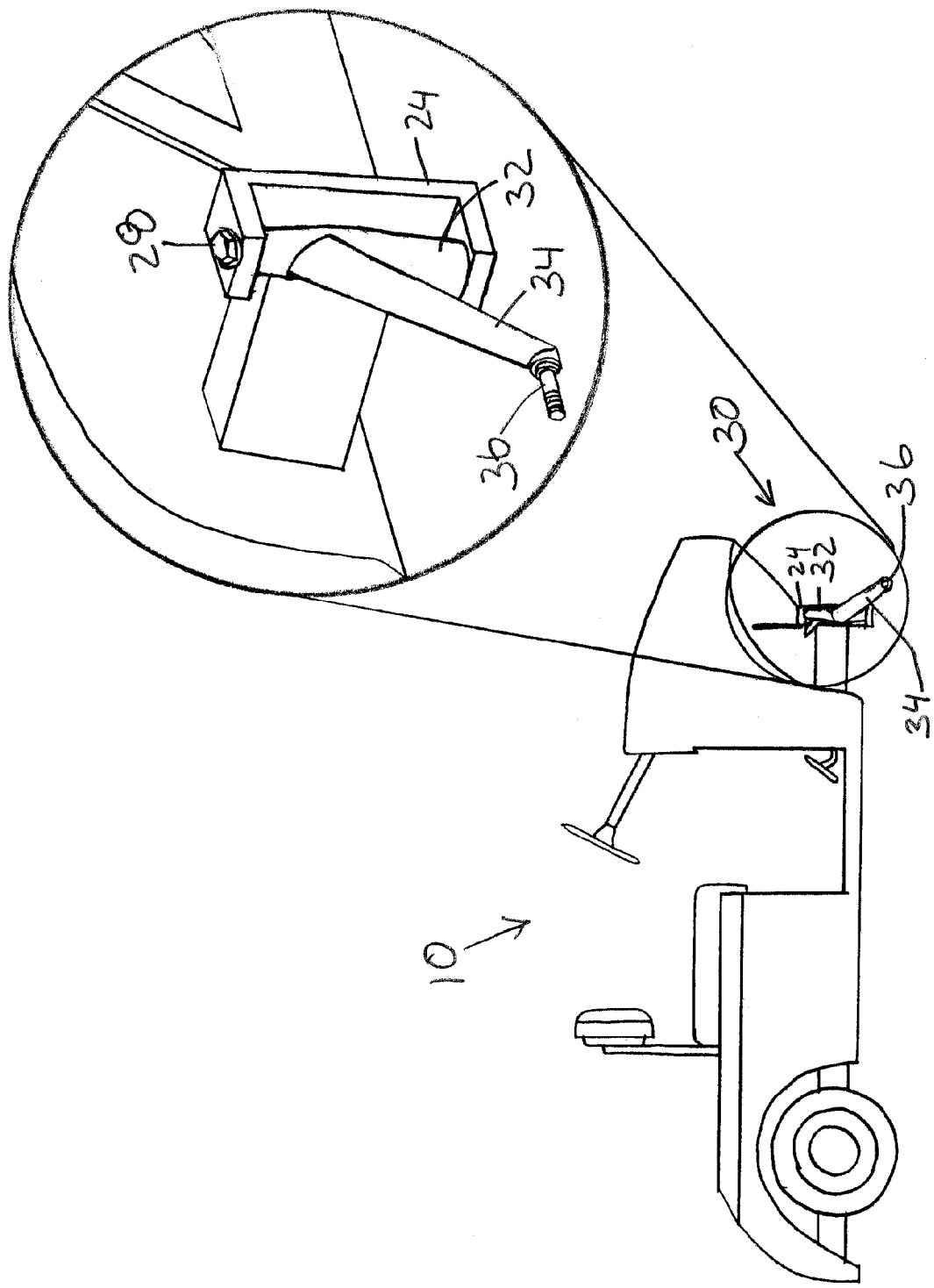
FIG. 7 is a side view of a golf cart using a spindle according to the present invention.
Figure 8:
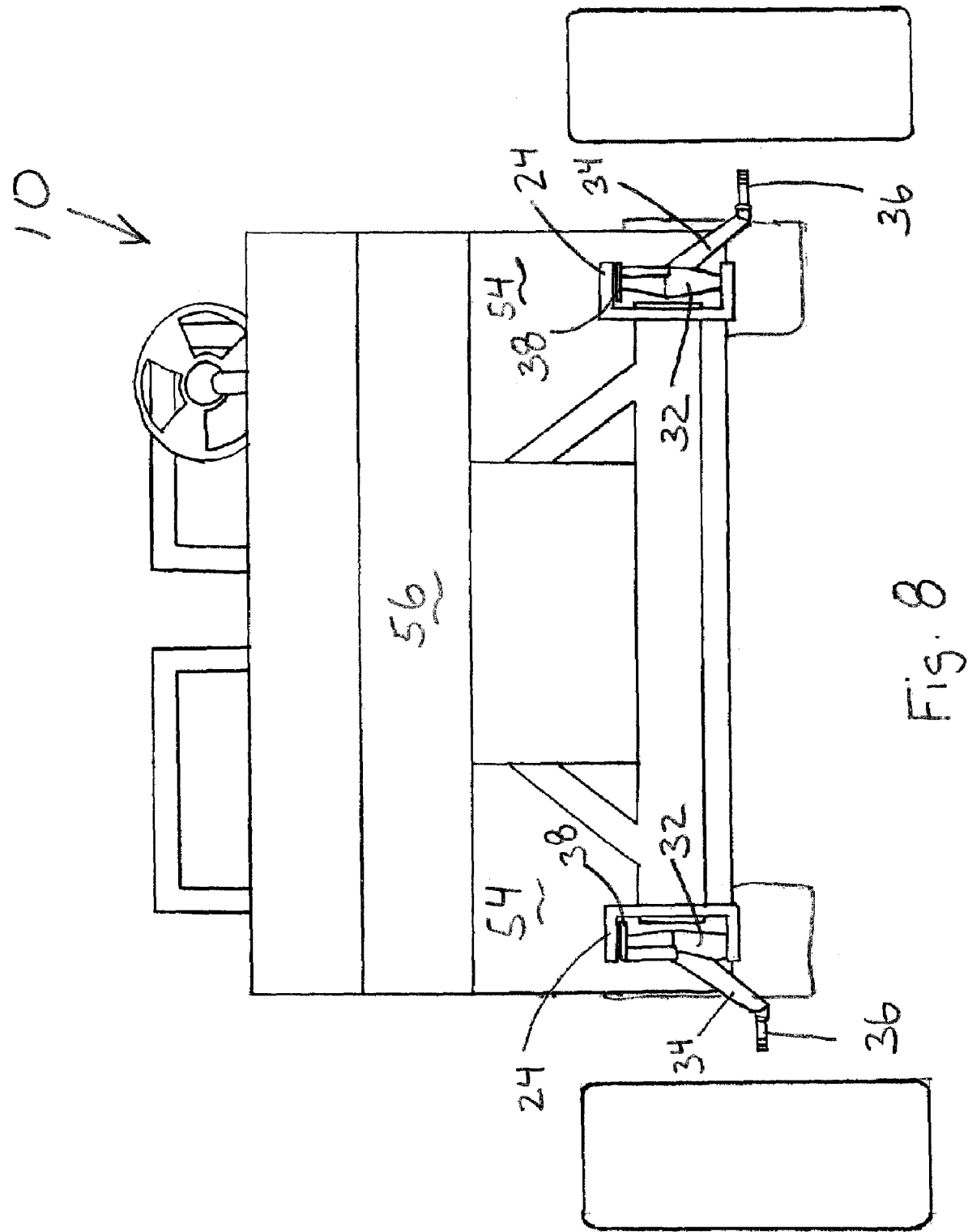
FIG. 8 is a front view of a golf cart using a spindle according to the present invention.

The present invention is spindle 30 for a golf cart 10 which allows the installation of a larger wheel and tire combination on the front of a golf cart 10. The present invention is also a method of making the spindle to fit almost any production golf cart on the market. FIG. 4 shows a spindle 30 according to the present invention. The spindle 30 of FIG. 4 includes a spindle body 32, spindle leg 34, axle 36 and steering arm 38. The spindle body 32 is a hollow body which fits between the U-shaped bracket 24 of the frame of the golf cart 10, as shown in FIGS. 5b, and 6–8. FIG. 7 shows the bolt 28 which is installed through the U-shaped bracket 24 and the hollow spindle body 32 in a similar fashion to the prior art spindles 14. The spindle body 32 includes a bolt channel 40 from a top end 42 to a bottom end 44 to receive the bolt 28. A nut is used to secure the bolt 28 in place (not shown). FIG. 4 shows the spindle leg 34 angles forward from the spindle body 32. The axle 36 extends out from the spindle leg 34 to receive a larger wheel. FIG. 8 shows the spindle leg 34 extending outward from the spindle body 32. FIG. 5a shows a production spindle 14 of the prior art and FIG. 5b shows spindle 30 of FIG. 4. Notice, the axle 36 of FIG. 5b is positioned lower and forward as compared to the axle 22 of FIG. 5a. The intersection of lines 46 and 48 in FIG. 5a show the position of the axle 22 of the production spindle 14. The intersection of lines 50 and 52 in FIG. 5b show the position of the axle 36 of the spindle 30 of FIG. 4. Notice that lines 46 and 48 of FIG. 5a are superimposed onto FIG. 5b to shown the difference. By moving the axle 36 forward and downward, allows for a larger wheel and tire combination to clear a wheel well 54 of the body 56 of the golf cart 10, as shown in FIG. 6. The typical distance forward of the axle 36 of FIG. 5b as compared to the axle 22 of FIG. 5a is about two inches. The typical distance lower of the axle 36 of FIG. 5b as compared to axle 22 of FIG. 5a is about five inches. FIGS. 7 and 8 show the spindle leg 34 of the spindle 30 of FIG. 4 extending outward from the U-shaped bracket 24 and thereby extends the axle 36 away from the spindle body 32. When a wheel is mounted on the axle 35, the wheel is further away from the U-shaped bracket 24 and the body 56 of the golf cart 10, as compared to the axle 22 of FIGS. 2–3 of the production spindle 14. The typical distances of the axle 36 is moved forward and lowered is slight enough, so that the stability of the golf cart 10 is not dramatically changed, though it will change the stability to some extent. FIG. 9b shows the use of the spindle 30 of FIG. 4 and FIG. 9a shows the use of the production spindle 14. Notice, the golf cart 10 of FIG. 9b has increase ground clearance as compared to the golf cart 10 of FIG. 9a.

Figure 10:
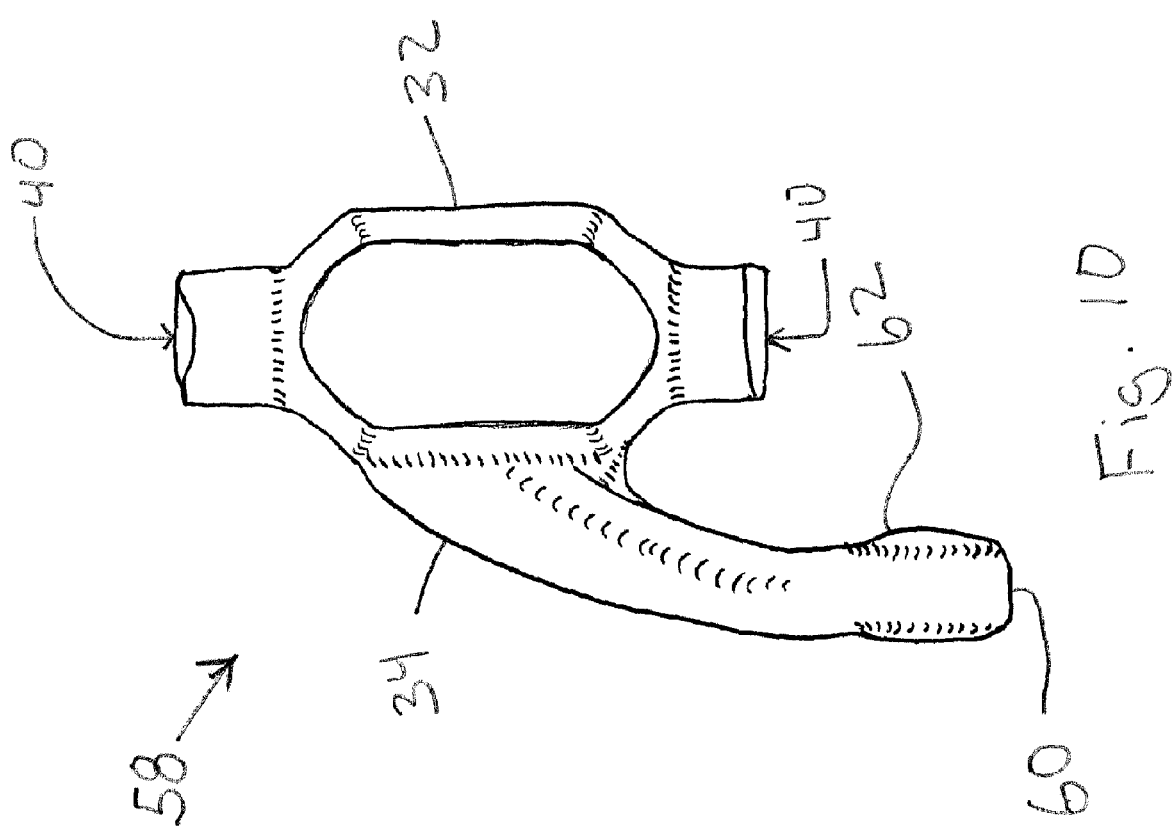
FIG. 10 is a perspective view of a rough cast of a spindle according to the present invention.
Figure 11:
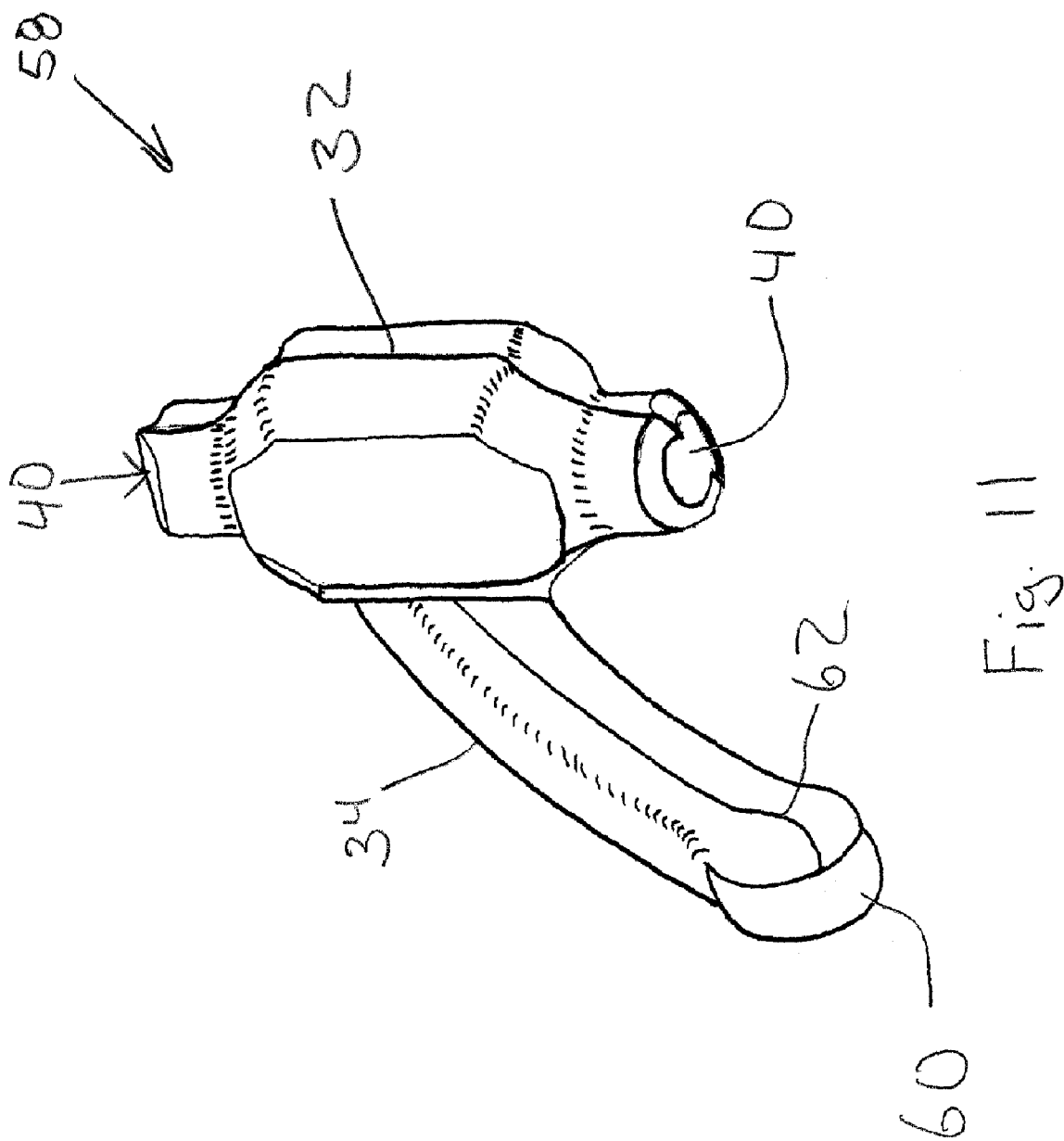
FIG. 11 is a perspective view of a rough cast of a spindle according to the present invention.
Figure 12:
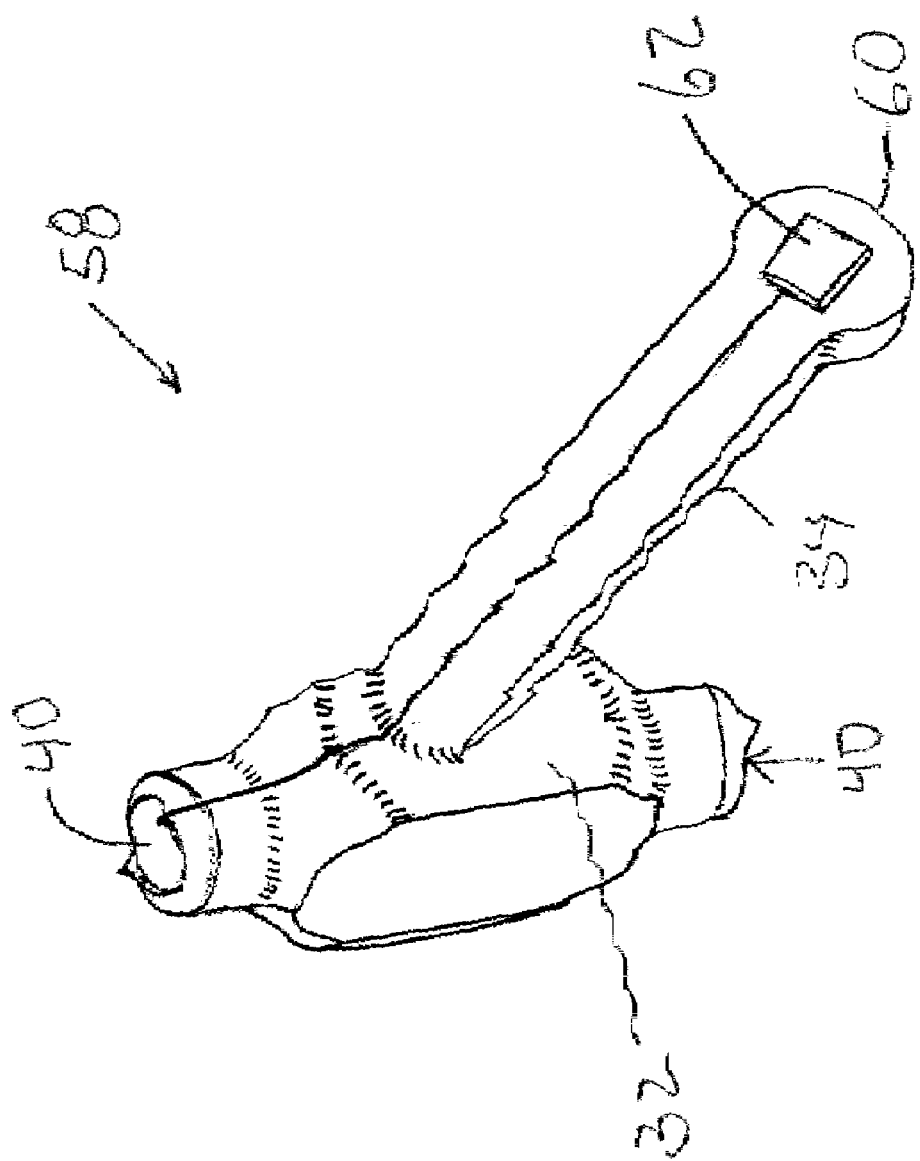
FIG. 12 is a perspective view of a rough cast of a spindle according to the present invention.

FIGS. 10–22 show a method of making the spindle of FIG. 4. There are many golf cart manufactures that produce golf carts. Therefore, there are many different frame and body styles which are on the market. This presents a problem that just one spindle design can not accommodate every golf cart on the market. Each spindle can have different sizes and angles for the bolt channel in the spindle body for attachment to the U-shaped bracket, depending on the manufacturer and model. The angle the axle extends away from the spindle leg may need to be different depending on the particular golf cart. FIGS. 10–12 show a spindle 58 as an unfinished cast similar to the spindle 30 shown in FIG. 4. The spindle 58 of FIGS. 10–12 includes rough enlarged surfaces which are to be machined to fit a particular make and model golf cart. The spindle 58 of FIGS. 10–12 includes a hollow channel to become the bolt channel 40. An axle end 60 of the spindle leg 34 includes an axle area 62 that has enough material to be machined and drilled to receive the axle 36 at the proper angle, depending on the make and model of the golf cart.

Figure 13:
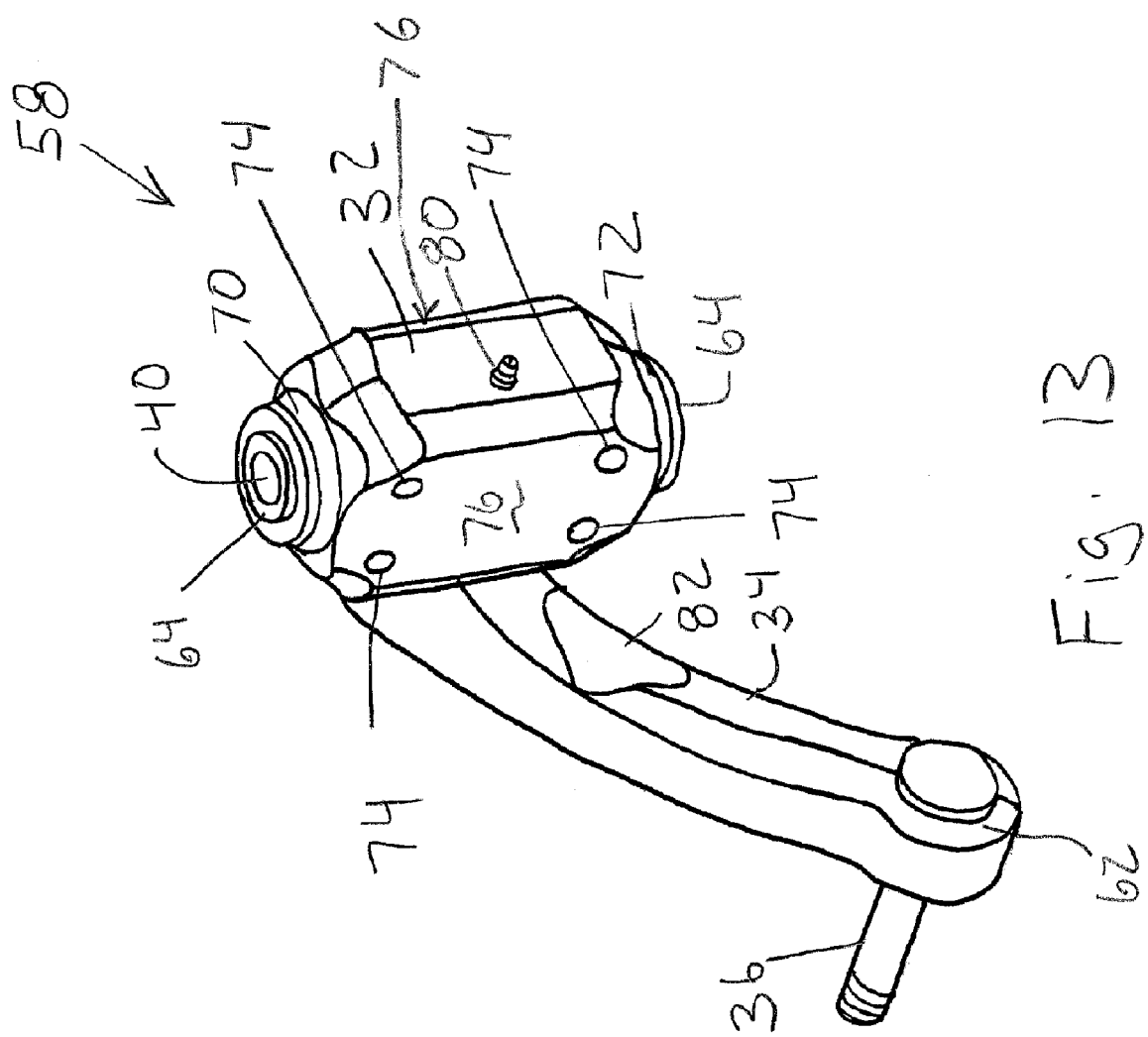
FIG. 13 is a perspective view of a spindle machined from the rough cast of a spindle shown in FIGS. 10–12 according to the present invention.
Figure 14:
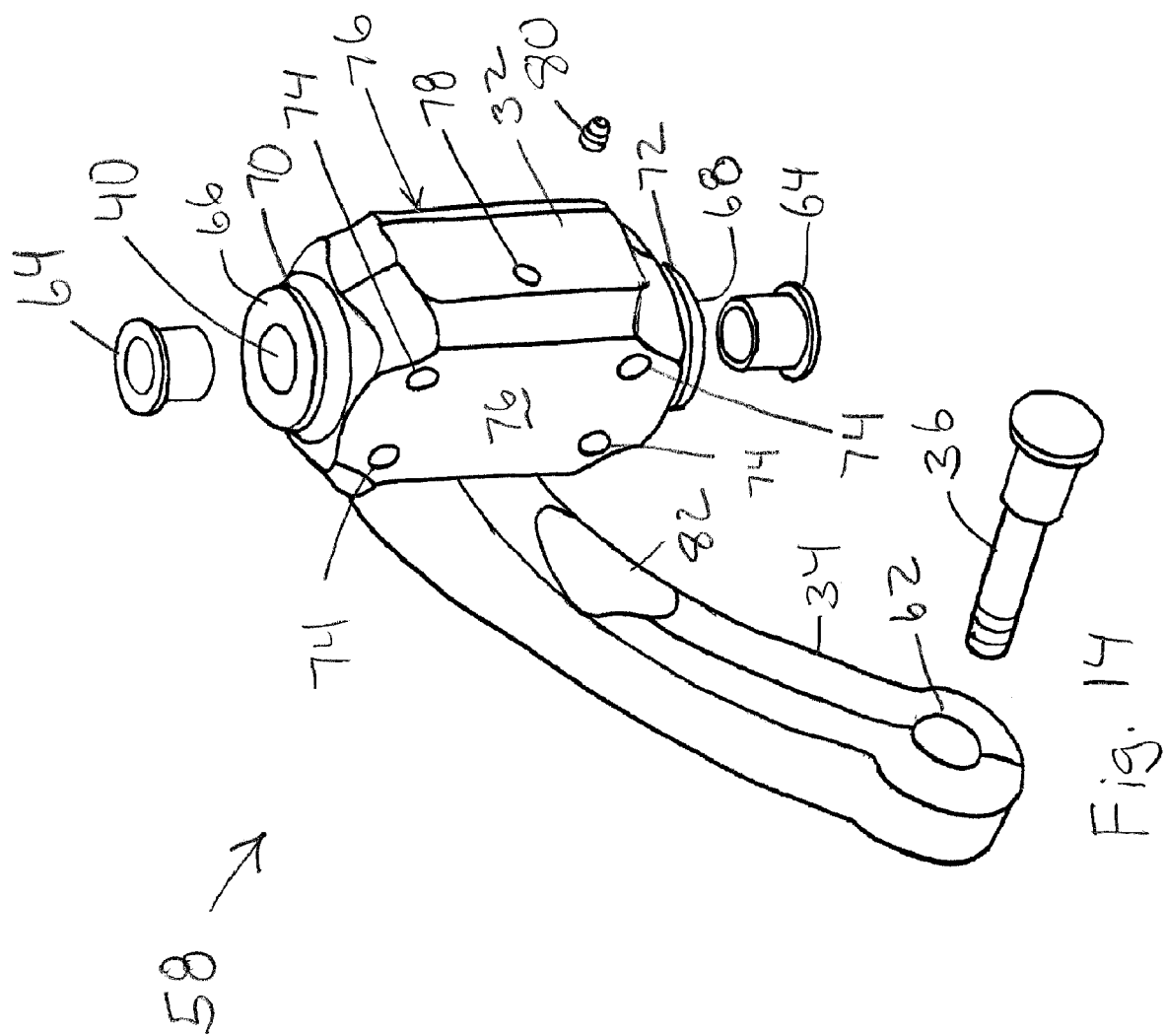
FIG. 14 is a perspective exploded view of a spindle machined from the rough cast of a spindle shown in FIGS. 10–12 according to the present invention.
Figure 15:
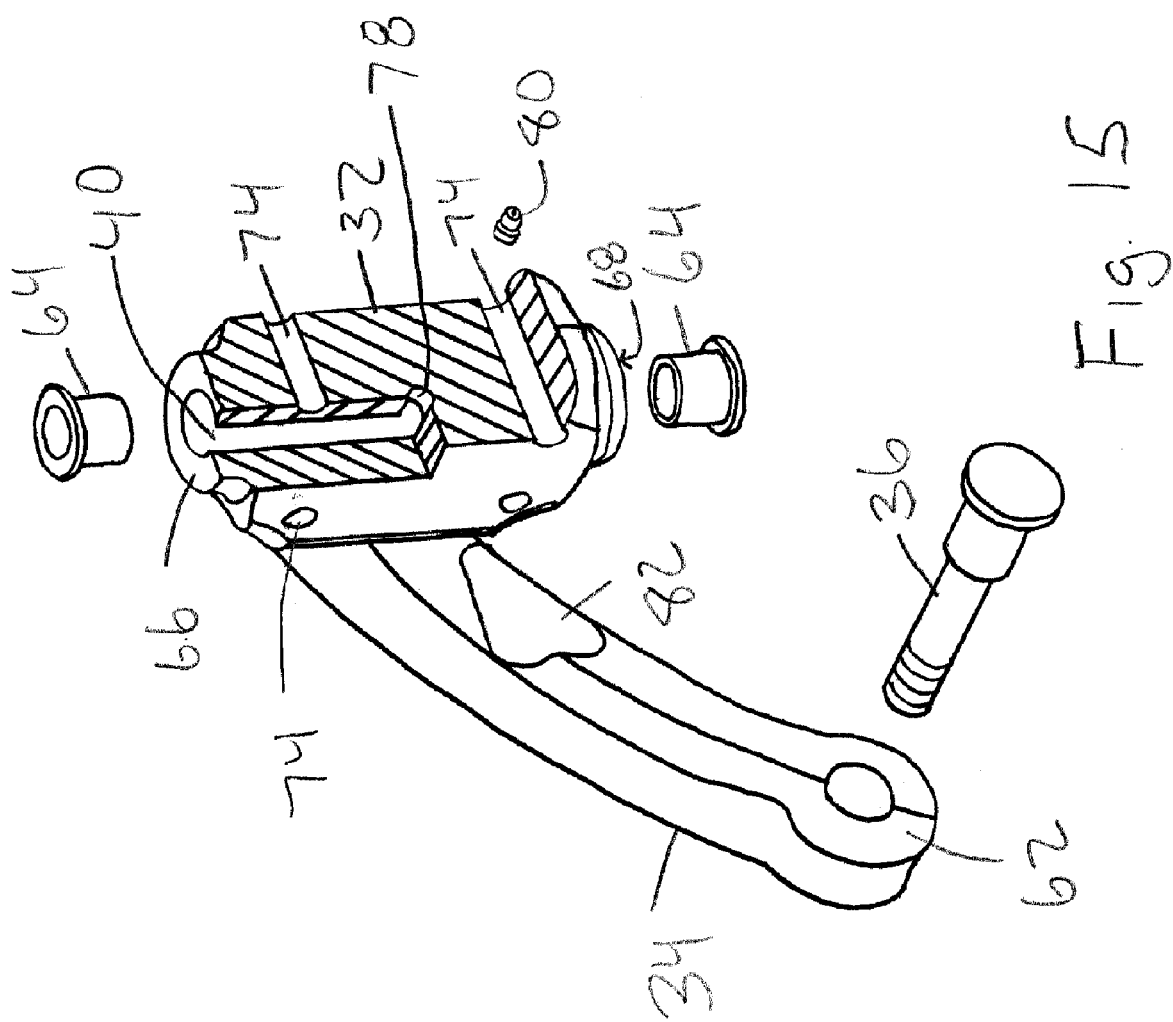
FIG. 15 is a perspective exploded cut-a-way view of a spindle machined from the rough cast of a spindle shown in FIGS. 10–12 according to the present invention.
Figure 16:
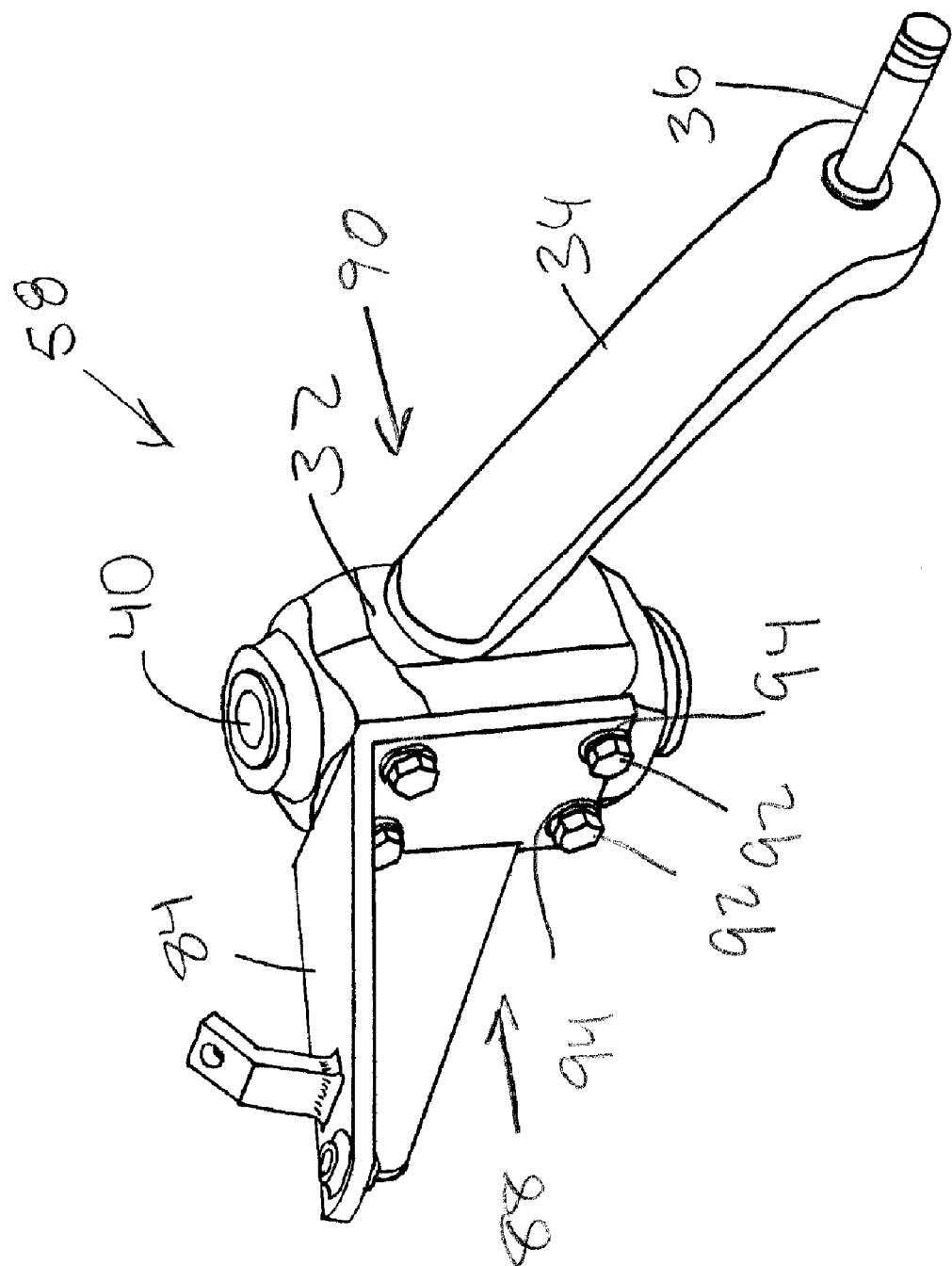
FIG. 16 is a perspective view of a spindle machined from the rough cast of a spindle shown in FIGS. 10–12 according to the present invention.
Figure 17:
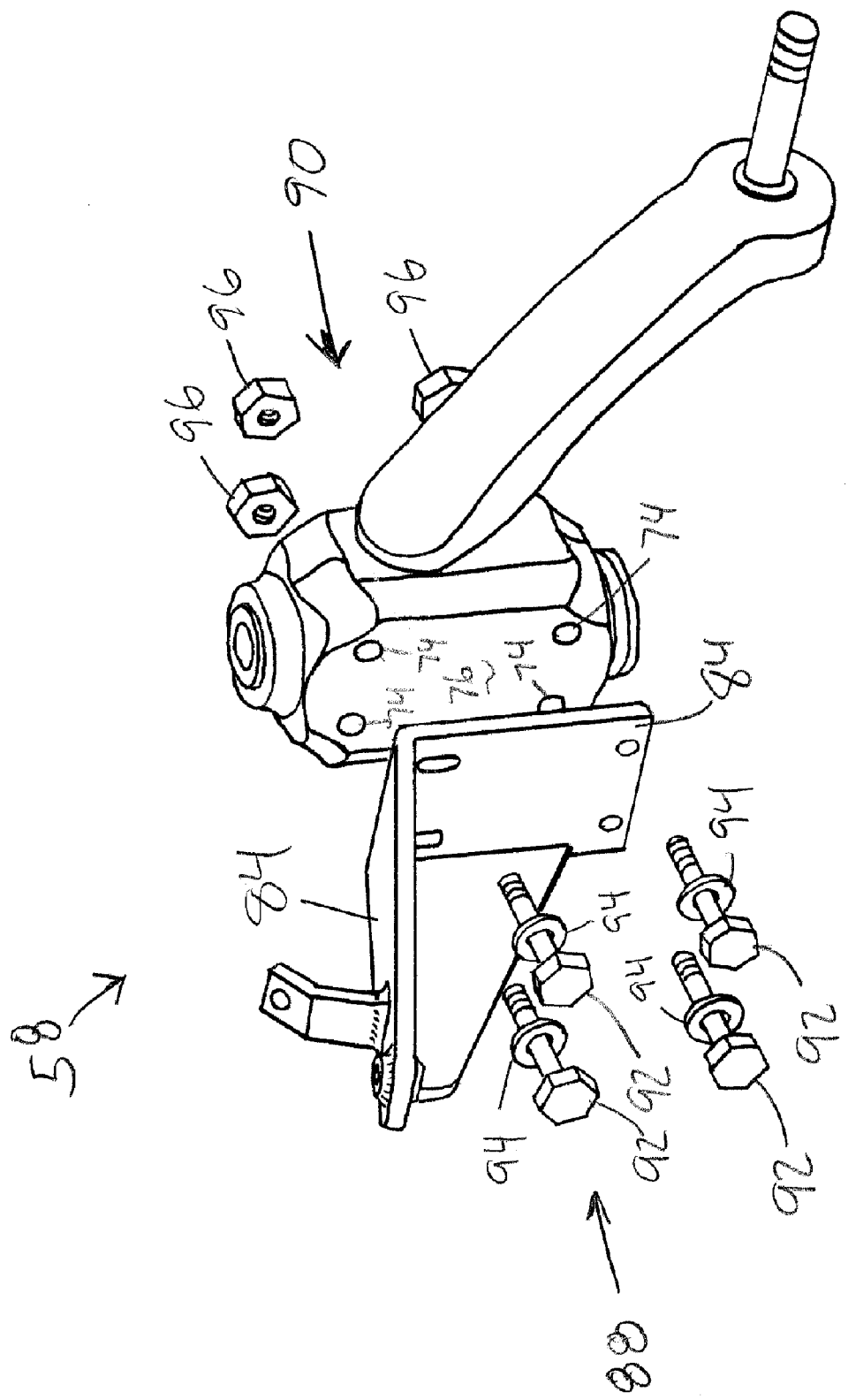
FIG. 17 is a perspective exploded view of the spindle of FIG. 16 according to the present invention.
Figure 18:
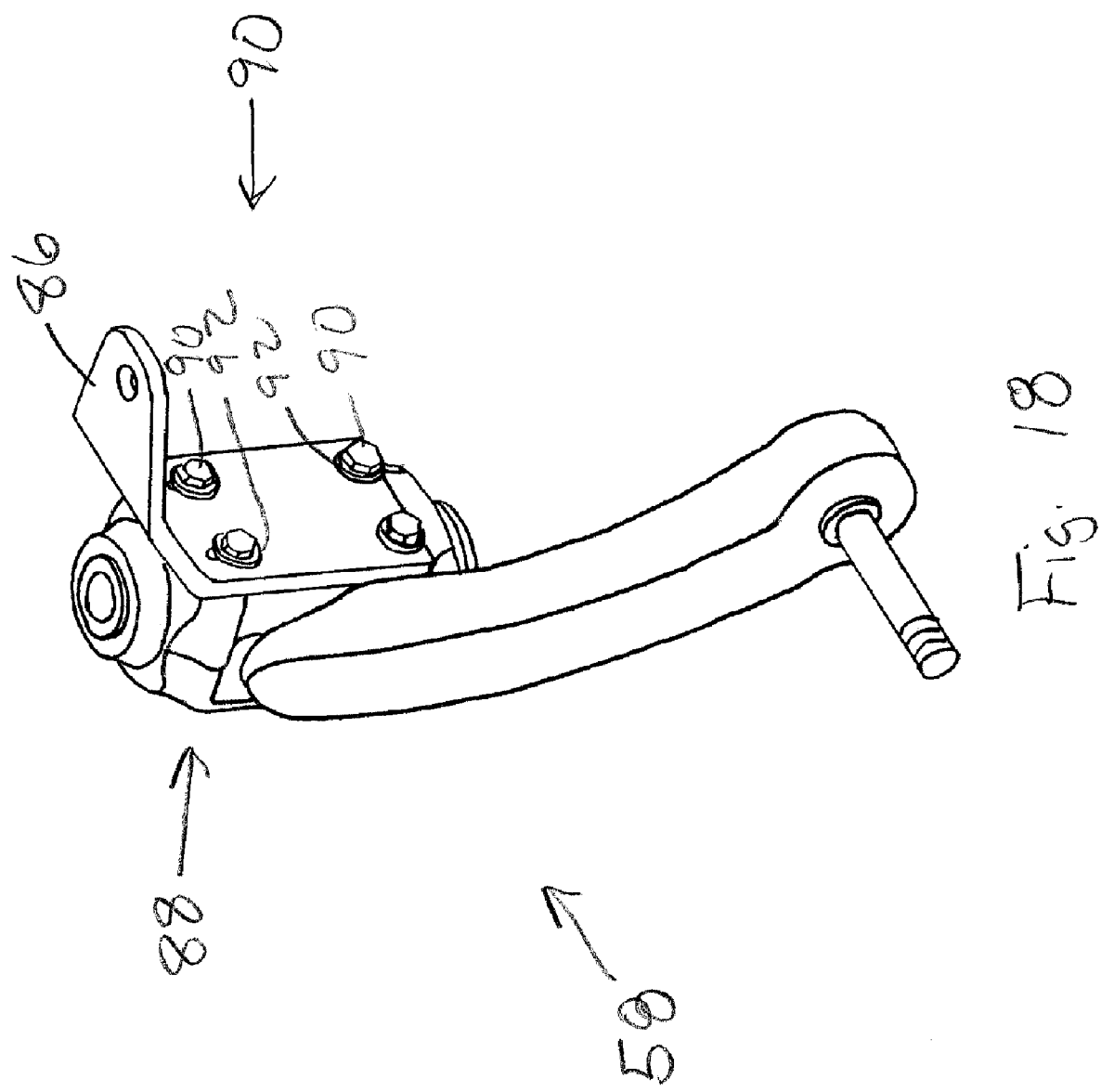
FIG. 18 is a perspective view of a spindle machined from the rough cast of a spindle shown in FIGS. 10–12 according to the present invention.
Figure 19:
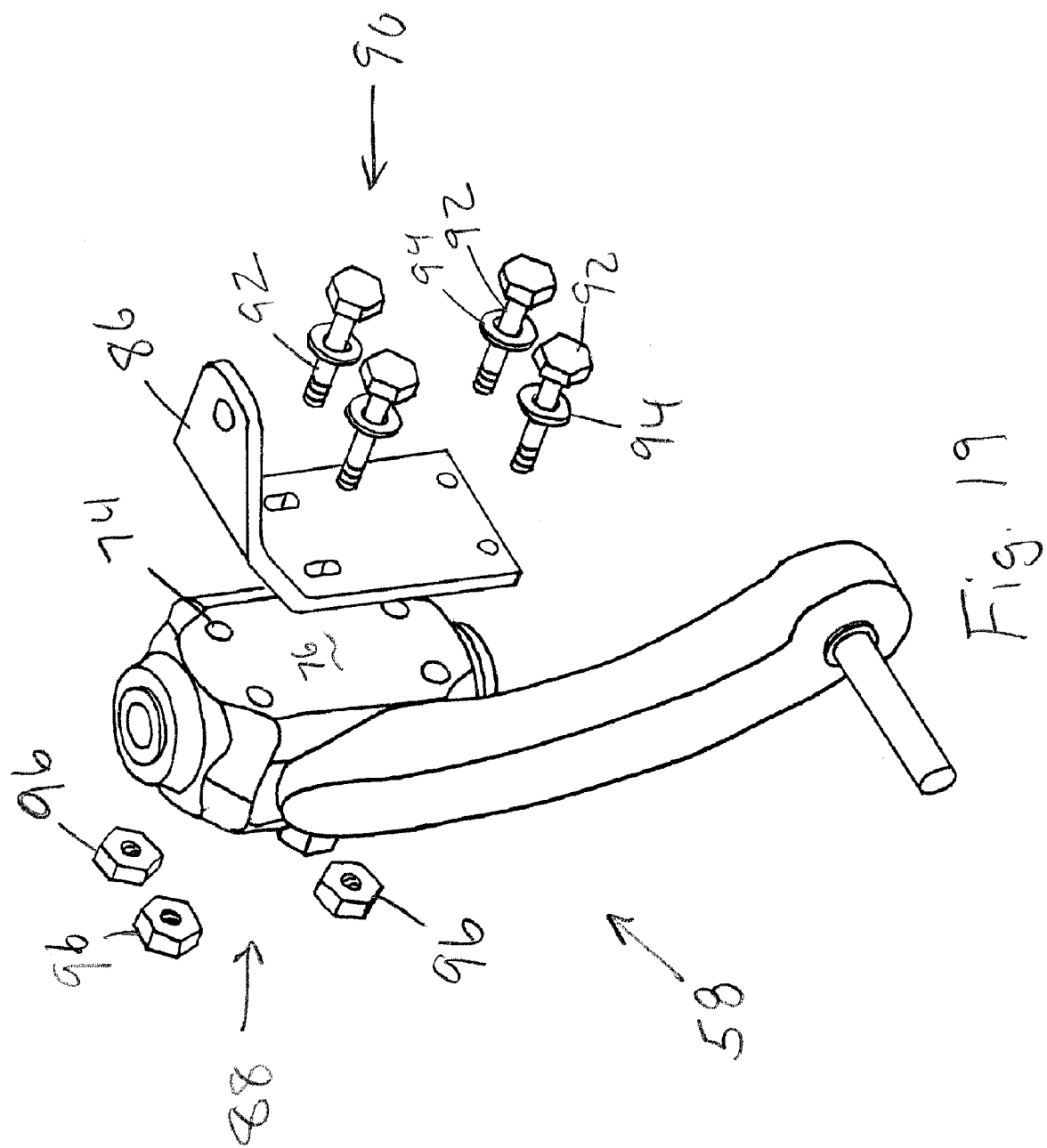
FIG. 19 is a perspective exploded view of the spindle of FIG. 18 according to the present invention.

FIGS. 13–15 show the spindle 58 after it has been machined from the spindle 58 shown in FIGS. 10–12 to fit a particular golf cart. The spindle body 32 has the bolt channel 40 drilled to accept bushings 64 of the proper size for the bolt 28 used with the production spindle 14 to attach the spindle 58 to the U-shaped bracket 24. A top face 66 and bottom face 68 about a top end 70 and bottom end 72 of the bolt channel 40 have been machined to form the proper angle and distance between the top face 66 and bottom face 68 to allow the spindle body 32 to properly fit between the U-shaped bracket 24. Accessory holes 74 have been drilled in the side faces 76 of the spindle body 32 to accept accessories devices. A grease fitting hole 78 is drilled from the outside of the spindle body 32 to the bolt channel 40 to receive a grease fitting 80 to allow the bolt 28 to be greased. The spindle leg 34 has been machined to provide the proper clearances for the spindle leg 34, as shown by area 82 in FIGS. 13–15. The proper clearances depend on the particular make and model golf cart to be fitted. The axle area 62 of the spindle leg 34 has been machined and drilled to mount the axle 36 at the proper angle for the particular make and model golf cart to which the spindle 58 will be mounted.

Figure 20:
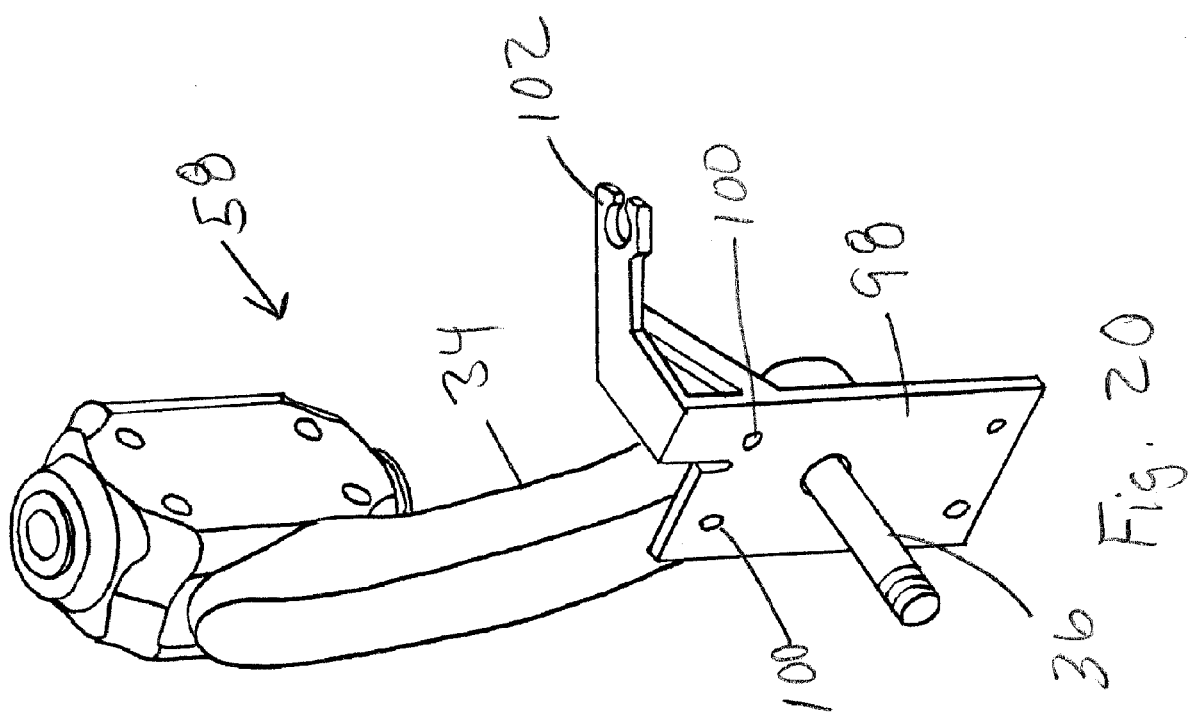
FIG. 20 is a perspective view of a spindle machined from the rough cast of a spindle shown in FIGS. 10–12 with a brake mounting plate according to the present invention.
Figure 21:
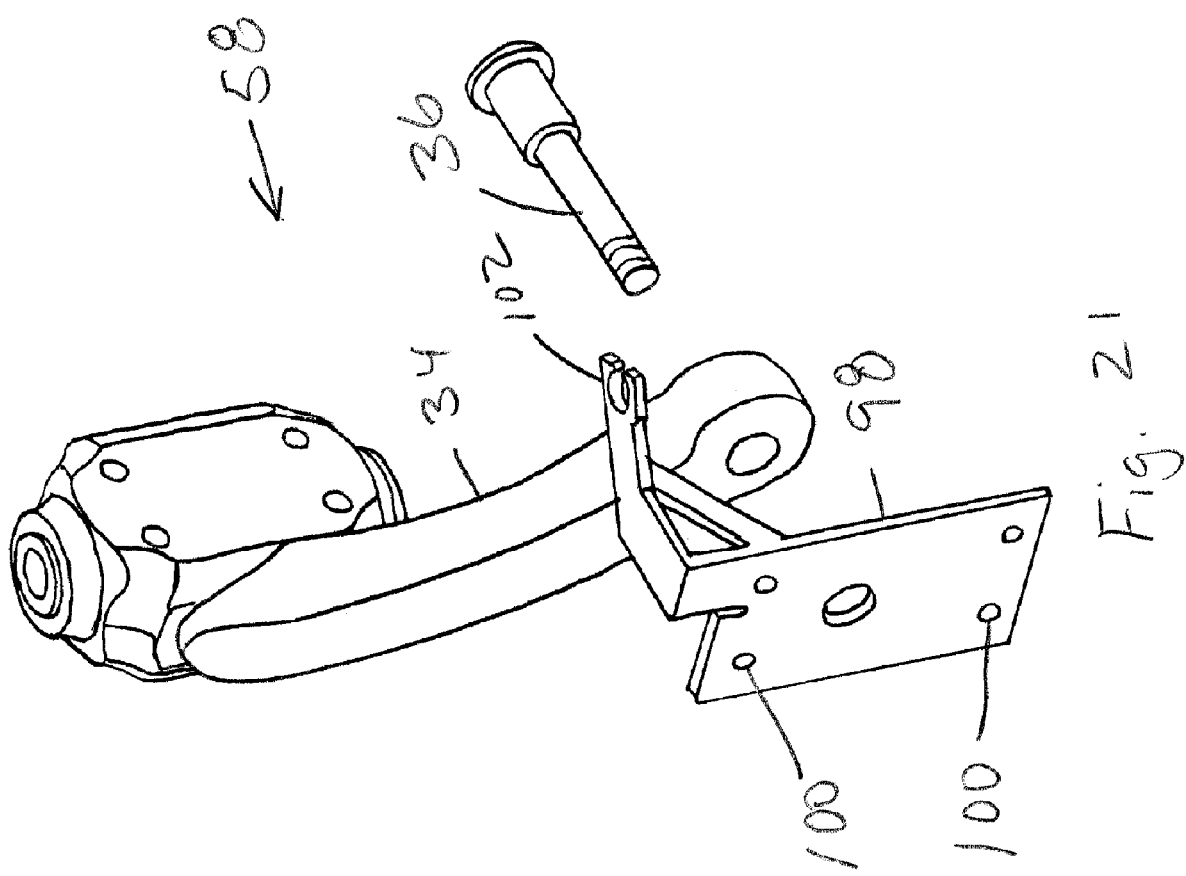
FIG. 21 is a perspective exploded view of a spindle of FIG. 20 according to the present invention.

FIGS. 16–17 and 18–19 show two types of steering arms 84, 86 mounted to the spindle body 32 of the spindle 58 shown in FIGS. 10–12 using accessory holes 74 depicted in FIGS. 13–15. The steering arm 84 of FIGS. 16–17 mount to the rear side 88 of the spindle body 32, while the steering arm 86 of FIGS. 18–19 mount to the front side 90 of the spindle body 32. Bolts 92, washers 94 and nuts 96 are used to secure the steering arms 84, 86 using the accessory holes 74. The accessory holes 74 allow the attachment of the proper steering arm, depending on the make and model of the golf cart. FIGS. 20–22 show a brake mounting plate 98 which is welded to the axle 36 as shown in FIG. 20. The brake mounting plate 98 allows a brake system to be mounted and used with the front wheels of the golf cart 10. The brake mounting plate 98 includes mounting holes 100 for brake components and a brake cable mount arm 102 to receive and secure a brake cable.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A golf cart spindle, for replacement of a production spindle with an axle attached to a golf cart so as to allow mounting of a larger wheel and tire combination on the golf cart, comprising:

a spindle body, said spindle body including a top end and a bottom end, said spindle body including a bolt channel between said top end and bottom end of said spindle body, said spindle body sized to fit existing front spindle supports of the golf cart as a replacement to the production spindle;

a spindle leg extending from said spindle body, said spindle leg having a spindle end attached to said spindle body; said spindle leg having an axle end;

an axle extending from said axle end of said spindle leg; and said spindle leg extending from said spindle body such that said axle end and said axle is positioned forward and lower than the original position of the axle of the production spindle.

2. The golf cart spindle of claim 1, wherein said axle extending from said axle end of said spindle leg is positioned about two inches forward than the original position of the axle of the production spindle.

3. The golf cart spindle of claim 1, wherein said axle extending from said axle end of said spindle leg is positioned about five inches lower than the original position of the axle of the production spindle.

4. The golf cart spindle of claim 2, wherein said axle extending from said axle end of said spindle leg is positioned about five inches lower than the original position of the axle of the production spindle.

5. The golf cart spindle of claim 1, wherein said spindle body includes a steering arm attached to said spindle body.

6. The golf cart spindle of claim 1, wherein said spindle body includes a steering arm that separately attaches to said spindle body.

7. The golf cart spindle of claim 1, wherein said golf cart spindle includes a brake mounting plate attached near said axle extending from said axle end of said spindle leg.

8. A method of mounting a larger wheel and tire combination on a front of a golf cart, comprising:
removing a production spindle from a front spindle support of the golf cart:
installing onto the front spindle support of the golf cart a new spindle having a spindle body, where the spindle body includes a top end and a bottom end, where the spindle body includes a bolt channel between the top end and bottom end of the spindle body, where the spindle body is sized to fit the front spindle support of the golf cart as a replacement to the production spindle; a spindle leg extending from the spindle body, the spindle leg having a spindle end attached to the spindle body; the spindle leg having an axle end; an axle extending from the axle end of the spindle leg; and the spindle leg extending from the spindle body such that the axle end and the axle is positioned forward and lower than the original position of the axle of the production spindle.

9. The method of claim 8, wherein the axle extending from the axle end of the spindle leg is positioned about two inches forward than the original position of the axle of the production spindle.

10. The method of claim 8, wherein the axle extending from the axle end of the spindle leg is positioned about five inches lower than the original position of the axle of the production spindle.

11. The method of claim 9, wherein the axle extending from the axle end of the spindle leg is positioned about five inches lower than the original position of the axle of the production spindle.

12. A method of making a golf cart replacement spindle to replace a production sized spindle having an axle that is attached to a front spindle support of a golf cart to allow mounting of a larger wheel and tire combination on almost any type of golf cart, the replacement spindle having a spindle body, where the spindle body includes a top end and a bottom end, where the spindle body includes a bolt channel between the top end and bottom end of the spindle body, where the spindle body is sized to fit the front spindle support of the golf cart as a replacement to the production spindle; a spindle leg extending from the spindle body, the spindle leg having a spindle end attached to the spindle body; the spindle leg having an axle end; an axle extending from the axle end of the spindle leg; and the spindle leg extending from the spindle body such that the axle end and the axle is positioned forward and lower than the original position of the axle of the production spindle, comprising:
casting a rough enlarged work piece including an spindle body with a hollow channel to form a bolt channel between a top and bottom of the spindle body, a spindle leg extending away from the spindle body, where the spindle leg has a spindle end attached to the spindle body, where the spindle leg has an axle end that extends forward and lower than the spindle body and where the axle end has enough material to be machined and drilled to receive an axle;
machining the spindle body to fit the front spindle support;
machining the top and bottom of the spindle body to accept a bolt used to secure the spindle body to the front spindle support;
machining the spindle leg if needed to allow clearance of the spindle leg with other parts of the golf cart; and
machining the axle end of the spindle leg and drilling the spindle leg at the proper angle, whereby the machining of the axle end and drilling depends on make and model of the golf cart to receive the replacement spindle.

13. The method of claim 12, further including machining a grease channel from an outside surface of the spindle body to the bolt channel of the spindle body.

14. The method of claim 12, further including machining accessory bolt holes in the spindle body to attach accessories to the spindle body.

15. The method of claim 12, further including machining the top an bottom of the spindle body to receive bushings.

* * * * *